No. 782,251. PATENTED FEB. 14, 1905.
G. W. JACKSON.
RACKING OFF AND CASK FILLING APPARATUS.
APPLICATION FILED OCT. 7, 1901. RENEWED OCT. 25, 1904.
2 SHEETS—SHEET 1.
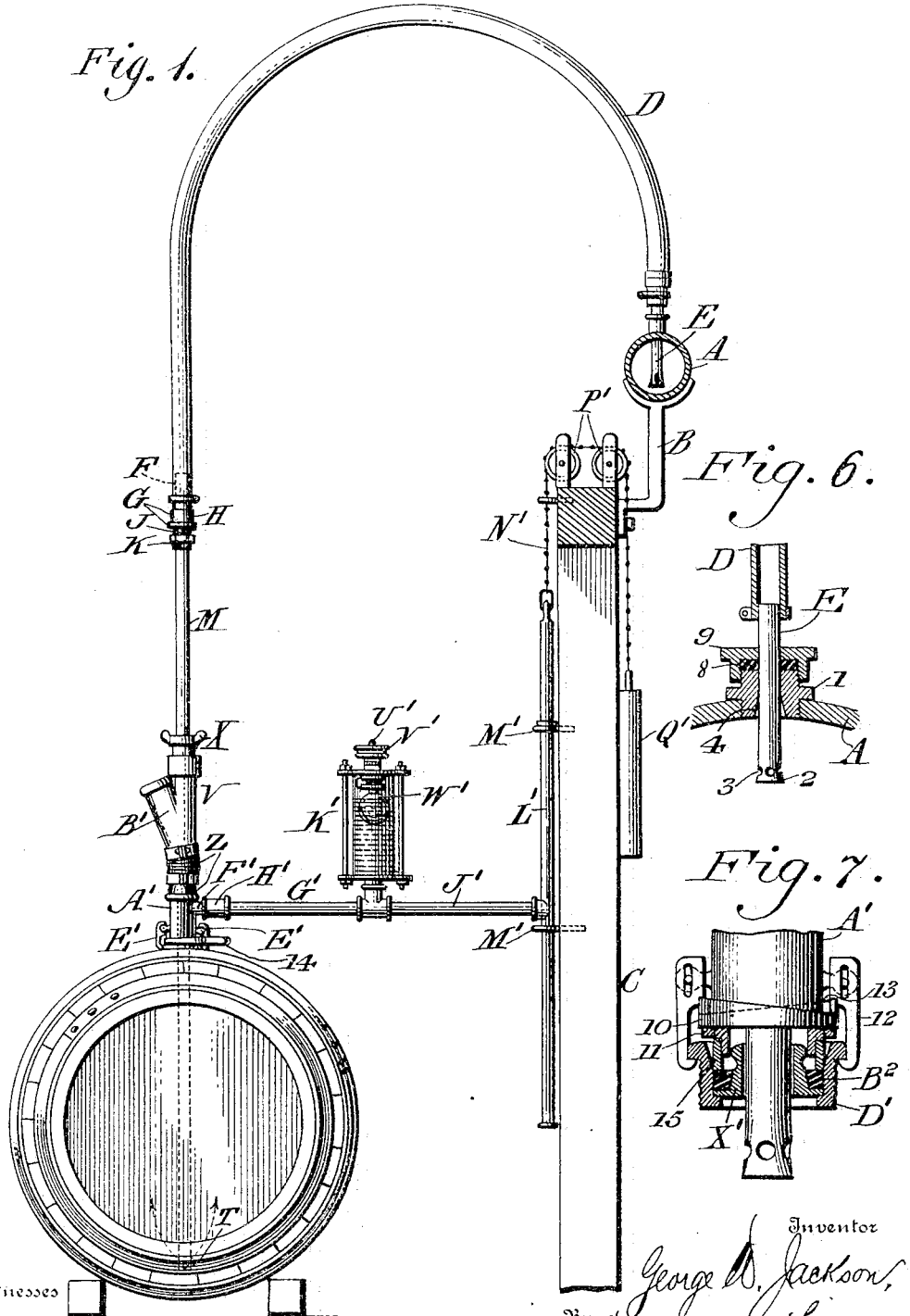

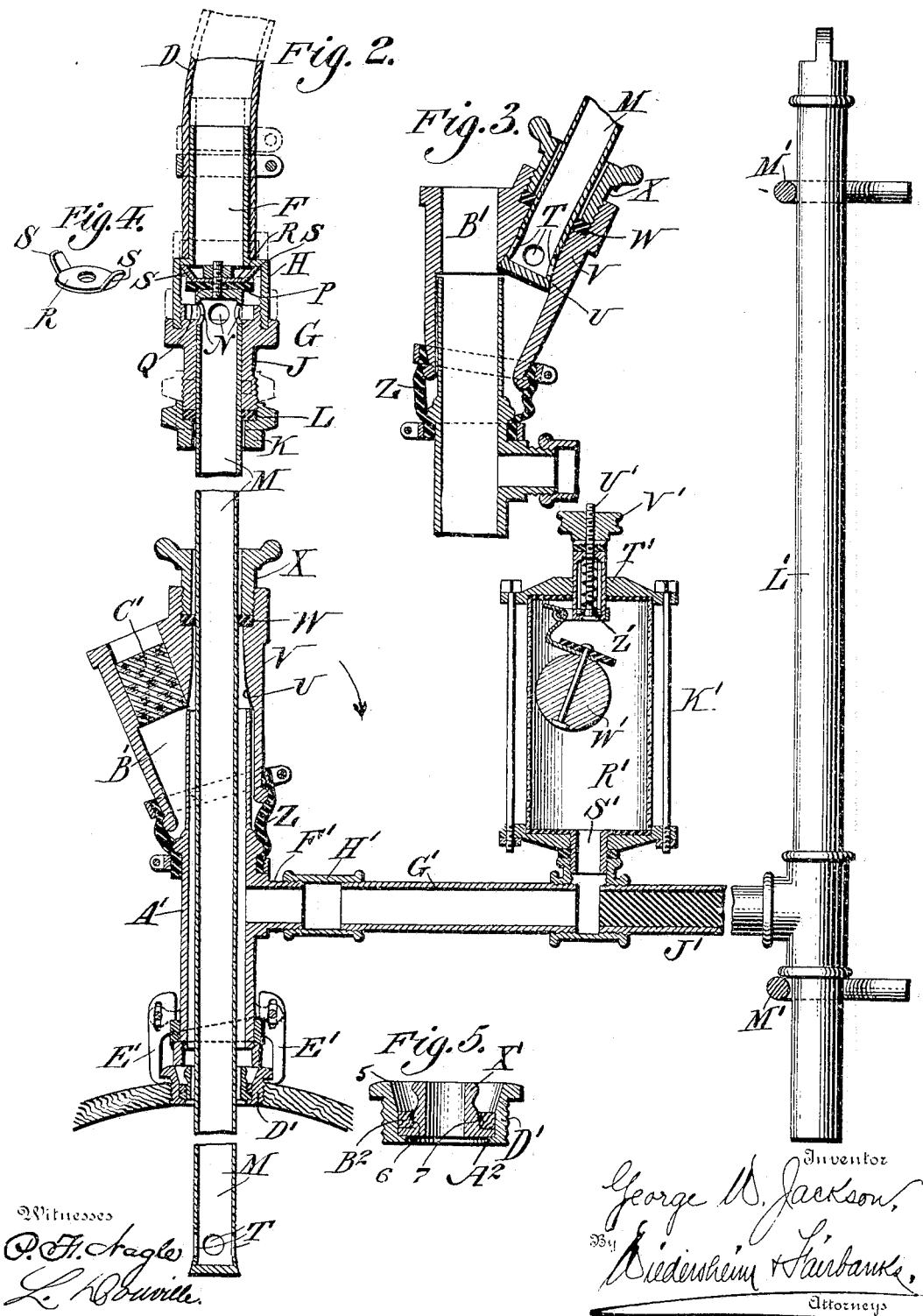

No. 782,251. Patented February 14, 1905.

UNITED STATES PATENT OFFICE.

GEORGE W. JACKSON, OF PHILADELPHIA, PENNSYLVANIA, ASSIGNOR OF ONE-HALF TO JAMES M. TIGHE, OF PHILADELPHIA, PENNSYLVANIA.

RACKING-OFF AND CASK-FILLING APPARATUS.

SPECIFICATION forming part of Letters Patent No. 782,251, dated February 14, 1905.

Application filed October 7, 1901. Renewed October 25, 1904. Serial No. 229,967.

*To all whom it may concern:*

Be it known that I, GEORGE W. JACKSON, of the city and county of Philadelphia, State of Pennsylvania, have invented a new and useful Improvement in Racking-Off and Cask-Filling Apparatus, of which the following is a specification.

My invention consists of an improved racking-off and cask-filling apparatus, as will be hereinafter fully described and specifically claimed.

Figure 1 represents a side elevation of a racking-off and cask-filling apparatus constructed in accordance with my invention. Fig. 2 represents a vertical section of a portion thereof, taken on an enlarged scale. Fig. 3 represents a vertical section of a portion of Fig. 2, showing the parts in a different position. Fig. 4 represents a perspective view of a plate hereinafter referred to. Fig. 5 represents a sectional view of a bung employed in connection with my invention. Fig. 6 represents a section, on an enlarged scale, of the joint between the supply and outlet pipes. Fig. 7 represents a partial side elevation and partial sectional view of the bung and locking device on an enlarged scale.

Similar characters of reference indicate corresponding parts in the figures.

Referring to the drawings, A designates a supply-pipe leading from any suitable source—for instance, from a cask of beer—and in the further description of my invention, although its use is not confined to racking-off and filling casks with beer, I will use this example as an illustration. The said pipe A is supported on the bracket B, which is carried by an upright or standard C.

D designates a flexible pipe or hose that connects with the short pipe E, extending into said pipe A. The short pipe E acts as a nozzle and slides through the bushing 1, tapped into the pipe A. The extremity of nozzle E is closed, while its end portion is tapered, as at 2, said tapered portion being provided with ports 3. The inner end of the opening through the bushing 1 is tapered, as at 4, correspondingly with the end portion of the nozzle E and said tapering portion being ground to form a joint, thereby providing a valve. Thus the short pipe or nozzle E can be moved outwardly to close the communication between the pipe A and outlet-pipe E. This is especially useful, not only for the purpose of cleaning the pipe A, but for closing off any one of the pipes D when there are several of them leading from the common supply-pipe A. A tight joint is made between the nozzle E and bushing 1 by means of the washer 8, held in place by the collar 9, screw-threaded upon the outer end of the bushing 1. The flexible pipe D is coupled at its other end to a pipe-section F, that carries at its lower end the valve-casing, (indicated as a whole by G,) said valve-casing consisting of an upper enlarged section H and a lower reduced section J, conveniently joined by screw-threads, while a nut K screws on to the lower end of the lower section J and serves to compress between it and said section a washer L, through which the pipe M is adapted to slide. The said pipe M fits closely within the lower section J and is provided at its upper end with a plurality of openings N, that are closed when they stand within the reduced bore of the lower section J, the said lower section J thus acting as a valve. The upper end of the pipe M is closed, and upon the same is mounted a washer P, adapted to rest upon the seat Q when the openings N of the pipe M are closed by the lower section J. Resting upon the washer P is a plate R, having inclined projections S, that come in contact with the upper end of the enlarged section H of the valve-casing G to limit the relative longitudinal movement of the pipe M and valve-casing in one direction, it being noted that when the washer P contacts with the seat Q longitudinal movement in the other direction is arrested.

The pipe M is adapted to extend into a barrel and forms a passage through which the beer is fed to the barrel, and its lower end is closed; but the lower end portions are provided with lateral openings T, through which the beer can pass into the barrel. The lower end portion of the pipe M also flares outwardly to fit into the flaring portion U of a movable coupling V, said coupling being provided at its upper end with a washer W and gland X, through which the pipe M slides. The lower end of the coupling V is connected, by means of a flexible coupling Z, with a suitable portion of a pipe A', the said coupling V being also provided with an offset B', having a passage therethrough, into which is adapted to be placed a cork or other suitable closure C', it being noticed that the said passage is at an angle to the main passage through the coupling V. The said pipe A' is adapted to rest upon a suitable support, in the present instance upon the ring D' of the bung, and is clamped thereto by means of the arms E', which are suitably secured to said pipe A'.

F' designates a connecting lug or nipple, with a passage therethrough, on the pipe A' and which is connected with the pipe G' by a coupling H', said pipe G' being rigidly secured to a rod J', which latter and the pipe G' support the controlling-valve, (designated as a whole by the reference-letter K',) said rod J' being also secured to the weighted rod or bar L', which is guided in the eyes M', one end of which has connected therewith a chain or cord N', which passes over the pulleys P' and has secured to its opposite end the weight Q'. The construction of the controlling-valve K' is as follows: R' designates a chamber the walls of which are in the present instance formed of glass, and S' designates a passage communicating with the interior of said chamber and with said pipe G'. Near the top of said chamber R' is a valve T', having a threaded stem U', engaged by the nut V', said valve having a suitable valve-seat and is spring-actuated. W' designates a float-valve which is situated on the interior of said chamber R' and is normally in the position seen in Fig. 2 and when seated closes the passage Z', leading to the valve T'.

In Figs. 5 and 6 I have shown two forms of bungs, in each of which the usual form of collar D' is employed. The bung shown in Fig. 5 is especially adapted for use in connection with the racking-off and cask-filling apparatus above described and comprises a bushing D', which is screwed into the bung-hole of the barrel, said bushing being provided with an inwardly-projecting seat or shoulder A² at its inner end. The inner end portion of the side wall of the bushing D' is cylindrical, while the outer end portion tapers, as shown at 5. The collar or stopper X' is provided with an outwardly-extending flange 6 at its inner end, that rests upon the seat A², while the exterior portion of said collar is tapered, as shown at 7, said tapered portion of collar being situated opposite the cylindrical portion of the bushing. To hold said parts in position and to close the bung, I employ a yielding washer B², preferably of some compressible wood, that is first driven past the inclined portion 5 of the bushing D', which compresses the same, after which it is forced into the annular space between the cylindrical portion of the bung and the tapered portion of the collar, being wedged therein tightly, so that when the moisture from the barrel reaches said collar it is expanded with great force and holds the collar firmly in position and closes the bung. The opening through the collar is closed, of course, by the stopper C', that is driven into the same in the manner hereinafter described.

The operation is as follows: The pipe M having been placed within the barrel or cask to be filled, the beer from the storage-receptacle is allowed to flow through the pipe A and passes through the pipe E into the pipe D, thence around the plate R and through the openings N of the pipe M, through the latter, and into the keg through the openings T. The air which is in the keg will pass out through the space between the walls of the pipe M and the collar X' and into the pipe A' and will then pass through the nipple F' and the pipe G' and through the passages S' into the chamber R'. From thence it will escape to the atmosphere by raising the valve T'. This will continue until the beer fills the keg and the air is exhausted from the keg, when the beer will flow into the pipe A' and thence into the chamber R' until the float-valve W' is elevated and closes the escape from the chamber R', the parts assuming the position seen in Fig. 1, so that the passage of the beer to the keg will be stopped. When this occurs, the operator raises the nut K, which elevates the lower reduced section J and seats the washer P upon the seat Q, so that the openings N will be closed and no more beer can pass into the pipe M, it being noted that when the coupling J is moved upward by the nut K the upper part H, connected with the flexible pipe D, is also raised by reason of the flexibility thereof. The pipe M is now raised or elevated until the flared end thereof fits the portion U of the movable coupling V, which is best seen in the right of Fig. 3, so that the openings T are closed, after which the coupling V is moved in the direction indicated by the arrow in Fig. 2 until the passage B' is in line with the pipe A', it being noted that the amount of beer which has entered the pipe G' and the chamber is of such a quantity as to equal the amount of displacement caused by the pipe M in the keg and that hence this beer will flow back into the keg and fill the same completely. When this has occurred, the cork or bung C' can be forced through the pipe A' and engaged with the collar X' of the bung, after which by proper manipulation of the clutch-arm E' the pipe A' is released from the bung and all the parts can be elevated by the operator, the weight Q' assisting in this operation, as will be seen from Fig. 1.

It will be seen that a plurality of devices as described may be employed, thus permitting the filling of a number of barrels at one time, it being seen that as soon as one barrel is filled it can be removed and an empty one placed in position.

It will of course be evident that slight changes may be made by those skilled in the art which will come within the scope of my invention, and I do not, therefore, desire to be limited in every instance to the exact construction herein shown and described.

In Fig. 7 I have shown, on a larger scale than in Fig. 2, the construction for connecting the racking-off and filling apparatus with the bung, comprising a rotatable cam 10, supported by a shoulder 11 on the lower end of pipe A' and engaging hooks 12, having slotted connections with lugs 13 upon pipe A. The cam 10 is turned by handle 14, Fig. 1, and when the hooks 12 engage the rim of bushing D' the device is held firmly thereto. The lower end of pipe A' receives the upper end of the collar X', while a gasket 15, seated in an annular groove in the lower end of pipe A', is compressed against the washer B² and forms a tight joint.

Having thus described my invention, what I claim as new, and desire to secure by Letters Patent, is—

1. In a racking-off and cask-filling apparatus, a main supply-pipe, a pipe leading therefrom, a second pipe adapted to be inserted into a cask, said second pipe having an opening at its upper end portion, a coupling between the upper end portion of said second pipe and said first-mentioned pipe, said second pipe being longitudinally movable relative to said coupling and adapted to open and close said opening, a coupling for connecting said second-mentioned pipe with a keg or barrel and through which said second pipe is longitudinally movable, an opening at the lower end of said pipe adapted to be closed by the longitudinal movement thereof, means for permitting the escape of air from said cask, and means actuated by the liquid contents of the cask for closing said escape automatically.

2. In a racking-off and cask-filling apparatus, a main supply-pipe, a pipe leading therefrom, a second pipe communicating with the first-mentioned pipe, a valve therebetween actuated by the relative longitudinal movement of said pipes, said second pipe being adapted to be inserted in a barrel, a valve communicating with the interior of said keg for permitting the escape of air therefrom, and means for closing said valve by the action of the beer.

3. In a device of the character described, a pipe leading from a main supply-pipe, a second pipe communicating therewith and adapted to be inserted into a cask, a surrounding pipe through which said second-mentioned pipe passes, said surrounding pipe being provided with means for its attachment to a cask, a valve between said second pipe and surrounding pipe actuated by the relative movement of said second pipe, means for permitting said second-mentioned pipe to be raised and lowered in said surrounding pipe, and means for permitting the insertion of a cork or bung in said surrounding pipe into the bung proper.

4. In a device of the character described, a pipe communicating with the interior of a keg or barrel, a pipe surrounding said first-mentioned pipe, a coupling, a flexible connection between said coupling and said surrounding pipe and passages in said coupling situated at an angle to each other.

5. In a racking-off and cask-filling apparatus, a main supply-pipe, a pipe leading therefrom, a second pipe communicating with the latter and adapted to be inserted into a keg or barrel, a fitting upon the end of said second pipe and the pipe communicating therewith, lateral openings in the upper end of said pipe adapted to be closed by the longitudinal movement of said fitting, a coupling surrounding the lower portion of said second pipe and having an interior seat at its upper end, the lower end portion of said second pipe having lateral openings adapted to be closed by said seat, an outlet from said coupling to permit the escape of the air from said barrel, and means actuated by the liquid contents of the barrel for closing the said escape automatically.

6. In a device of the character described, a pipe leading from a source of supply and adapted to be inserted into a keg, a second pipe surrounding said pipe and provided with means for its attachment to a keg, a valve controlling an inlet to said first-mentioned pipe and actuated by the relative movement thereof, said pipe being movable longitudinally within said surrounding pipe, and means for permitting the insertion of a cork or bung through said surrounding pipe into the bung proper.

GEORGE W. JACKSON.

Witnesses:
HARRY COBB KENNEDY,
C. D. McVAY.